United States Patent Office 3,828,006
Patented Aug. 6, 1974

3,828,006
POLYESTERS PREPARED FROM BISPHENOLS AND ISOPROPYLIDENE BIS(p-PHENYLENE-OXY)DIACETYL CHLORIDE
Robert J. Thomas, Midland, Mich., assignor to The Dow Chemical Company, Midland, Mich.
No Drawing. Filed Aug. 6, 1973, Ser. No. 385,913
Int. Cl. C08g 17/08
U.S. Cl. 260—47 C  4 Claims

ABSTRACT OF THE DISCLOSURE

Bisphenol and halogenated bisphenol polyesters of bisacid A2 can be molded into hard transparent solid articles. The polyesters are readily made by reacting the bisacid chloride with the bisphenol in an organic solvent solution and in the presence of an HCl scavenger.

BACKGROUND OF THE INVENTION

The present invention relates to new thermoplastic polymers and particularly to polyesters whose molecular structure consists largely of alkylidene-bisphenol moieties.

Bisacid A2 is the common name of the Bisphenol A based diacid isopropylidenebis(p-phenyleneoxy)diacetic acid. Previously known polyesters of this dicarboxylic acid have been aliphatic polyesters made by reacting the diacid with alkylene glycols and glycol ethers, see Nanu et al., Chem. Abstr. 68:69428s and Boboescu et al., Chem. Abstr. 69:36500b: These resins were dark colored and relatively low melting.

SUMMARY OF THE INVENTION

It has now been found that bisphenol polyesters of bisacid A2 have significantly higher softening points and can be made with little or no color so as to be useful molding polymers. These bisphenol polyesters consist essentially of repeating units of the formula

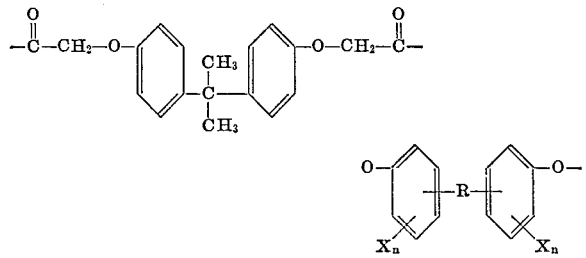

wherein R is a lower alkylidene radical of 1-4 carbon atoms, X is Cl or Br, and $n$ is an integer from zero to two. The polyesters are preferably made by reacting the bisacid chloride with an equivalent amount of bisphenol at low to moderate temperature using an organic solvent reaction medium and an HCl scavenger.

DETAILED DESCRIPTION

The bisphenol reactants of the present invention include alkylidenebisphenols such as o,o'-methylenediphenol, p,p' - ethylidenediphenol, p,p' - sec.-butylidenediphenol, and particularly Bisphenol A which is p,p'-isopropylidenediphenol. Also included are their dihalogenated and tetrahalogenated derivatives, for example, 2,2' - methylenebis(4 - chlorophenol), 4,4'-methylenebis(2,6 - dibromophenol), 4,4 - isopropylidenebis(2-bromophenol), 4,4' - isopropylidenebis(2,6 - dichlorophenol), 4,4'-sec.-butylidenebis(2-chlorophenol), and the like. The polyesters of halogenated bisphenols are of special interest for their fire retardant properties. The polyesters of brominated bisphenols are particularly noteworthy in this respect.

It has been found that polyester products of the best physical properties are obtained by reacting the bisacid chloride with about an equivalent amount of the bisphenol in inert organic solvent solution in the presence of an acid acceptor and preferably at about room temperature although temperatures up to the boiling point of the reaction solution may be employed. Methylene chloride is a preferred reaction solvent. Other suitable solvents are toluene, chloroform, chlorobenzene, and other such inert hydrocarbons and halogenated hydrocarbons.

The most convenient acid acceptors for the reaction are tertiary amines such as triethylamine or pyridine which are soluble in the reaction mixture. Other types of acid acceptors such as sodium carbonate or lime can also be used but are less convenient. Generally, a slight excess of acceptor is used.

The polyester product can be separated and purified by any convenient method. Efficient separation is obtained by washing the reaction mixture with water to remove the amine hydrochloride or other acid acceptor salt and any excess of acid acceptor and then adding the washed organic layer to a nonsolvent for the polymer such as methanol. The precipitated polymer is then easily washed and dried for use. The procedure can be repeated if desired to remove the last traces of chloride and unreacted starting material. Redissolving and reprecipitating the polymer also removes some of the lower molecular weight polymer.

The products are white to off-white solids which when molded form hard transparent articles. The polymers are not affected by water or alcohols, but are dissolved by chlorinated hydrocarbons.

Example 1

A mixture of 9.13 g. Bisphenol A, 15.24 g. of isopropylidenebis(p-phenyleneoxy)diacetyl chloride, and 125 ml. of methylene chloride was placed in a small reactor flask equipped with a stirrer, dropping funnel, and a reflux condenser vented through a drying tube. Dried triethylamine was added dropwise to the stirred mixture until a total of 8.1 g. had been added, addition time 15 minutes. At this point the bisphenol had essentially all dissolved. Stirring was continued at room temperature for two hours with a viscosity buildup noted at about ten minutes.

The reaction product was then stirred with 200 ml. of 1% aqueous HCl and the aqueous layer was decanted. The organic solution was washed with water until the wash was free of chloride ion and more methylene chloride was added to the viscous solution. The solution was then poured into excess methanol and solid polymer precipitated. The precipitate was washed once with methanol, redissolved in methylene chloride, precipitated again in methanol, washed as before and vacuum dried at 80° C. This material was found to contain some residual impurities so the reprecipitation and washing process was repeated on a portion of the product. The purified product was a white solid which softened at about 120° C. and was found to have an inherent viscosity of 0.70 as determined on a solution of 0.10 g. in 25 ml. of trichloroethylene at 25° C. Gel phase chromatographic examination indicated a weight average molecular weight $M_w=49000$ and an average molecular weight based on number of molecules $M_n=7450$. The ratio $M_w/M_n=6.6$ indicated a relatively broad distribution of molecular weight.

A test disc was molded at 125° C., 10 minutes at 10,000 p.s.i. The molded plastic was hard, transparent, and nearly colorless. The disc could be broken by bending.

Example 2

A reaction mixture was formed as described in Example 1 except that 14.64 g. of 4,4'-isopropylidenebis(2,6-dichlorophenol) was substituted for the Bisphenol A. The yellow solution thereby obtained was stirred at room temperature while 8.5 g. of triethylamine was added dropwise in 25 minutes. The reaction mixture, which had become viscous at this point, was then stirred for an additional two hours.

The reaction mixture was then stirred with 150 ml. of 1% aqueous HCl. The aqueous layer was decanted off and the organic layer was washed with water until the wash water was free of chloride. The polymer product was precipitated by pouring the washed organic layer into methanol. The precipitated polymer was filtered off and dried as before to obtain 25 g. of white solid. Inherent viscosity determined as in Example 1 was 0.19.

I claim:

1. A thermoplastic polymer consisting essentially of repeating units of the formula

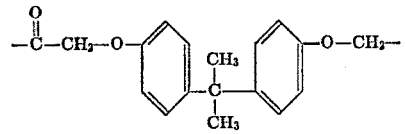

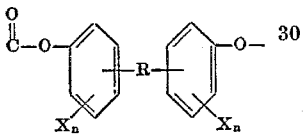

wherein R is a lower alkylidene group, X is Cl or Br, and $n$ is an integer from zero to two.

2. The polymer of Claim 1 wherein R is an isopropylidene group attached to each benzene ring in the position para to the oxygen substituent.

3. The polymer of Claim 2 wherein $n$ is zero.

4. The polymer of Claim 2 wherein X is Cl and $n$ is two.

References Cited

UNITED STATES PATENTS

| | | | |
|---|---|---|---|
| 2,444,594 | 7/1948 | Day et al. | 260—520 |
| 2,470,651 | 5/1949 | Schaffel | 260—75 |
| 2,961,427 | 11/1960 | Walter | 260—47 |
| 3,351,624 | 11/1967 | Conix | 260—47 |

LESTER L. LEE, Primary Examiner

U.S. Cl. X.R.

260—33.8 R, Dig. 24